United States Patent
Ito et al.

(10) Patent No.: US 11,408,837 B2
(45) Date of Patent: Aug. 9, 2022

(54) ANALYSIS METHOD FOR FINE STRUCTURE, AND APPARATUS AND PROGRAM THEREOF

(71) Applicant: Rigaku Corporation, Akishima (JP)

(72) Inventors: Yoshiyasu Ito, Tachikawa (JP); Kazuhiko Omote, Akiruno (JP)

(73) Assignee: RIGAKU CORPORATION, Akishima (JP)

( * ) Notice: Subject to any disclaimer, the term of this patent is extended or adjusted under 35 U.S.C. 154(b) by 0 days.

(21) Appl. No.: 16/854,381

(22) Filed: Apr. 21, 2020

(65) Prior Publication Data

US 2020/0333267 A1     Oct. 22, 2020

(30) Foreign Application Priority Data

Apr. 22, 2019  (JP) .............................. JP2019-081350

(51) Int. Cl.
 *G01N 23/201*   (2018.01)
 *G01N 23/20008*  (2018.01)

(52) U.S. Cl.
 CPC ..... *G01N 23/201* (2013.01); *G01N 23/20008* (2013.01); *G01N 2223/054* (2013.01); *G01N 2223/1016* (2013.01); *G01N 2223/302* (2013.01); *G01N 2223/305* (2013.01); *G01N 2223/3306* (2013.01); *G01N 2223/611* (2013.01); *G01N 2223/6116* (2013.01)

(58) Field of Classification Search
 None
 See application file for complete search history.

(56) References Cited

U.S. PATENT DOCUMENTS

| | | |
|---|---|---|
| 8,908,830 B2 | 12/2014 | Omote et al. |
| 9,297,772 B2 | 3/2016 | Fu et al. |
| 10,352,695 B2 | 7/2019 | Dziura et al. |

(Continued)

FOREIGN PATENT DOCUMENTS

| | | |
|---|---|---|
| JP | 2015-78988 A | 4/2015 |
| JP | 2017-125848 A | 7/2017 |

(Continued)

OTHER PUBLICATIONS

Japanese Office Action for Japanese Application No. 2019-081350, dated Apr. 26, 2022, with English translation.

*Primary Examiner* — Thomas R Artman
(74) *Attorney, Agent, or Firm* — Birch, Stewart, Kolasch & Birch, LLP

(57) ABSTRACT

Provided is a fine structure determination method capable of easily determining tilt angles of columnar scattering bodies that are long in a thickness direction, and provided are an analysis apparatus and an analysis program thereof. There is provided an analysis method for a fine structure of a plate-shaped sample formed to have columnar scattering bodies that are long in a thickness direction and periodically arranged, comprising the steps of preparing scattering intensity data from the plate-shaped sample, that is generated via transmission of X-rays; and determining tilt angles of the scattering bodies in the plate-shaped sample with respect to a reference rotation position at which a surface of the plate-shaped sample is perpendicular to an incident direction of the X-rays, based on the prepared scattering intensity data.

8 Claims, 12 Drawing Sheets

(56) References Cited

U.S. PATENT DOCUMENTS

| | | | |
|---|---|---|---|
| 10,727,142 B2 | 7/2020 | Gellineau et al. | |
| 10,775,323 B2 * | 9/2020 | Gellineau | G01N 23/205 |
| 11,131,637 B2 * | 9/2021 | Ito | G01N 23/20008 |
| 11,145,559 B2 | 10/2021 | Gellineau et al. | |
| 2012/0087473 A1 | 4/2012 | Omote et al. | |
| 2015/0036805 A1 | 2/2015 | Fu et al. | |
| 2017/0167862 A1 | 6/2017 | Dziura et al. | |
| 2017/0199136 A1 | 7/2017 | Krokhmal et al. | |
| 2018/0106735 A1 * | 4/2018 | Gellineau | G01B 15/04 |
| 2018/0113084 A1 * | 4/2018 | Hench | G01N 23/201 |
| 2018/0350699 A1 | 12/2018 | Gellineau et al. | |
| 2019/0302039 A1 * | 10/2019 | Artemiev | G01N 23/201 |
| 2019/0339215 A1 | 11/2019 | Krokhmal et al. | |
| 2020/0041426 A1 * | 2/2020 | Thompson | G01N 23/201 |
| 2020/0300790 A1 * | 9/2020 | Gellineau | G01N 23/205 |
| 2020/0303265 A1 | 9/2020 | Geluneau et al. | |
| 2020/0333267 A1 * | 10/2020 | Ito | G01N 23/20008 |
| 2020/0333268 A1 * | 10/2020 | Ito | G01N 23/201 |
| 2021/0407864 A1 | 12/2021 | Gellineau et al. | |

FOREIGN PATENT DOCUMENTS

| | | |
|---|---|---|
| JP | 2019-505766 A | 2/2019 |
| WO | WO 2010/119844 A1 | 10/2010 |
| WO | WO 2018/222613 A1 | 12/2018 |

* cited by examiner

| $D_X$ (nm) | $D_Y$ (nm) | $D_Y/D_X$ | $\sigma_P$ (nm) | $\Delta\omega$ (deg) | $\Delta\chi$ (deg) |
|---|---|---|---|---|---|
| 80 | 84 | 1.05 | 1.2 | 0.2 | 0.5 |

US 11,408,837 B2

ANALYSIS METHOD FOR FINE STRUCTURE, AND APPARATUS AND PROGRAM THEREOF

TECHNICAL FIELD

The present invention relates to an analysis method for a fine structure with periodical arrangement of scattering bodies that are long in a thickness direction of a plate-shaped sample, and to an apparatus and a program thereof.

RELATED ART

Semiconductor devices have been improved in miniaturization so far with a shallow groove pattern of 200 nm or less formed planarly, that is called a planar type. CD-SAXS of grazing angle incidence arrangement has been developed in order to meet needs of a shape measurement thereof (Refer to Patent Document 1).

However, it has reached the limit to improve an integration degree of a planar type semiconductor device, and thus it is accelerated to make the device be three-dimensional. It is like a change from a single-story house to a high-rise condominium to make this device be three-dimensional. On a wafer plane of a semiconductor device with three-dimensional structure, deep groove patterns are formed having a pattern pitch of a depth of several μm or more for a dimension of 100 nm. The needs are getting stronger for measurement tools capable of nondestructively and simply measuring such a pattern shape formed with grooves having a high aspect ratio.

On the other hand, known is transmission type small angle X-ray scattering (tSAXS) that X-ray beam is irradiated to a substrate sample, the incident beam transmits the structure and the scattered or diffracted beam is detected (Patent Document 2). For example, the apparatus described in Patent Document 2 amplifies a scattering intensity from the sample, and facilitates analyzing measurement of a pitch critical dimension, shape and fluctuation, when analyzing a structure in nanoscale by sub-nanometer wavelength X-ray radiation from a synchrotron X-ray source.

Further, disclosed has been a technique with which holes are accurately measured by reducing asymmetry caused by X-ray reflections from sidewalls of the holes each having a high aspect ratio inside a wafer (Refer to Patent Document 3) in the method according to Patent Document 3, hole pitches, diameters and depths of holes, and whether or not holes are inclined to the wafer surface and so forth are measured, based on a second distribution in which a level of the asymmetry is reduced relative to a first distribution of X-ray beams scattered from the sample.

PATENT DOCUMENT

[Patent Document 1] WO 2010/119844
[Patent Document 2] Japanese Unexamined Patent Application Publication No. 2015-78988
[Patent Document 3] Japanese Unexamined Patent Application Publication No. 2017-125848

Even though CD-SAXS of the grazing angle incidence arrangement is applied to patterns formed with grooves having a depth of several μm or more as described above, no sufficient result is obtained. That is, (1) the entering depth of X-rays is not sufficient, and (2) neither parallelism of incident X-rays to sufficiently observe interference fringes corresponding to a depth of several μm, nor angular resolution per pixel of a detector is obtained.

In contrast, a region having a sufficiently small $Q_z$ needs to be measured to observe the interference fringes corresponding to a depth of several μm. Transmission type CD-SAXS is suitable for realizing the foregoing. For this reason, it has been accelerated to develop an apparatus thereof.

In general, an X-ray small angle scattering pattern is given by the square of an absolute value of Fourier transformation of an electron number density distribution. However, phase information is missing in the X-ray small angle scattering pattern, and thus the electron number density distribution, that is, shapes of scattering bodies in a real space cannot be directly determined by inverse Fourier transformation. Then, according to the analysis of conventional X-ray small angle scattering, the shapes of scattering bodies are approximated by a simple spherical shape, a cylindrical shape, a cuboid or the like to determine the dimension thereof.

On the other hand, the pattern shape applied to an actual device in processing is more complicated, and thus it is insufficient only to determine the dimension approximated by a simple model. It is necessary that not only typical dimensions such as CD of a pattern and depth, but also distinctive parameters of another pattern can be measured with high accuracy. Specifically, when forming a number of columnar holes in a semiconductor, and approximation of determining tilt angles of the scattering bodies is effective with assumption that a sample model in which the scattering bodies are periodically arranged.

SUMMARY OF THE INVENTION

The present invention has been made in view of such a situation, and it is an object to provide a fine structure determination method capable of easily determining tilt angles of columnar scattering bodies that are long in a thickness direction, and to provide an analysis apparatus and an analysis program thereof.

(1) In order to achieve the above-described object, it is a feature that the determination method for a fine structure according to the present invention is a determination method for a fine structure of a plate-shaped sample formed to have columnar scattering bodies that are long in a thickness direction and periodically arranged, comprising the steps of preparing scattering intensity data from the plate-shaped sample, that is generated via transmission of X-rays; and determining tilt angles of the scattering bodies in the plate-shaped sample with respect to a reference rotation position at which a surface of the plate-shaped sample is perpendicular to an incident direction of the X-rays, based on the prepared scattering intensity data. In this manner, tilt angles of the columnar scattering bodies that are long in a thickness direction can be easily determined by transmitting X-rays in the plate-shaped sample and performing calculation based on the scattering intensity.

(2) Further, it is a feature that the determination method for the fine structure according to the present invention is the determination method, wherein the tilt angles of the scattering bodies are determined based on a difference between the reference rotation position and a specific rotation position at which a pattern of the prepared scattering intensity is symmetric. Consequently, the tilt angles of the scattering bodies with respect to the sample surface can be easily determined.

(3) Further, it is a feature that the determination method for the fine structure according to the present invention is the determination method, wherein the specific rotation position is determined based on a plurality of rotation positions at each of which an intensity by a predetermined reflection surface forms a peak. Consequently, the specific rotation position at which the scattering intensity pattern is symmetric can be quickly determined in an objective manner.

(4) Further, it is a feature that the determination method for the fine structure according to the present invention is the determination method, wherein the specific rotation position is determined based on a rotation position at which a difference of the scattering intensities at the symmetric positions is equal to or lower than a predetermined reference value. Consequently, the specific rotation position at which the scattering intensity pattern is symmetric can be easily specified.

(5) Further, it is a feature that the determination method for the fine structure according to the present invention is the determination method, wherein the step of determining the tilt angles of the scattering bodies further comprises a step of calculating a scattering intensity of X-rays via the sample model by assuming a sample model in which the scattering bodies are periodically arranged in a direction parallel to a surface of the plate-shaped sample with a length in the thickness direction of the scattering bodies as a known value to fit the calculated scattering intensity to the generated scattering intensity, and a step of determining optimum values of the tilt angles of the scattering bodies from the fitting result. In this manner, the tilt angles of the scattering bodies can be easily determined by fitting using the sample model.

(6) Further, it is a feature that the determination method for the fine structure according to the present invention is the determination method, wherein the plate-shaped sample is formed of silicon, and the scattering bodies each have a length of 200 nm or more and 20 µm or less. Even in such a silicon plate-shaped sample, shapes of the scattering bodies that are long in the thickness direction can be specified by using the scattering intensity via transmission of X-rays.

(7) Further, it is a feature that the analysis apparatus according to the present invention is an analysis apparatus for a fine structure of a plate-shaped sample formed to have columnar scattering bodies that are long in a thickness direction and periodically arranged, comprising a measurement data storage section that stores scattering intensity data from the plate-shaped sample, that is generated via transmission of X-rays; and a parameter determination section that determines tilt angles of the scattering bodies in the plate-shaped sample with respect to a reference rotation position at which a surface of the plate-shaped sample is perpendicular to an incident direction of the X-rays, based on the stored scattering intensity data. Consequently, the tilt angles of the columnar scattering bodies that are long in the thickness direction can be easily determined by carrying out the calculation based on the scattering intensity generated by the transmission of the X-rays.

(8) Further, it is a feature that the analysis program according to the present invention is an analysis apparatus for a fine structure of a plate-shaped sample formed to have columnar scattering bodies that are long in a thickness direction and periodically arranged, the program causing a computer to execute the processes of storing scattering intensity data from the plate-shaped sample, that is generated via transmission of X-rays; and determining tilt angles of the scattering bodies in the plate-shaped sample with respect to a reference rotation position at which a surface of the plate-shaped sample is perpendicular to an incident direction of the X-rays, based on the stored scattering intensity data. Consequently, the tilt angles of the columnar scattering bodies that are long in the thickness direction can be easily determined by carrying out the calculation based on the scattering intensity generated by the transmission of the X-rays.

According to the present invention, as to a plate-shaped sample formed to have scattering bodies that are long in a thickness direction and periodically arranged, easily determined can be tilt angles of columnar scattering bodies that are long in the thickness direction, that constitute a fine structure.

DETAILED DESCRIPTION OF EMBODIMENTS

Figure 1:
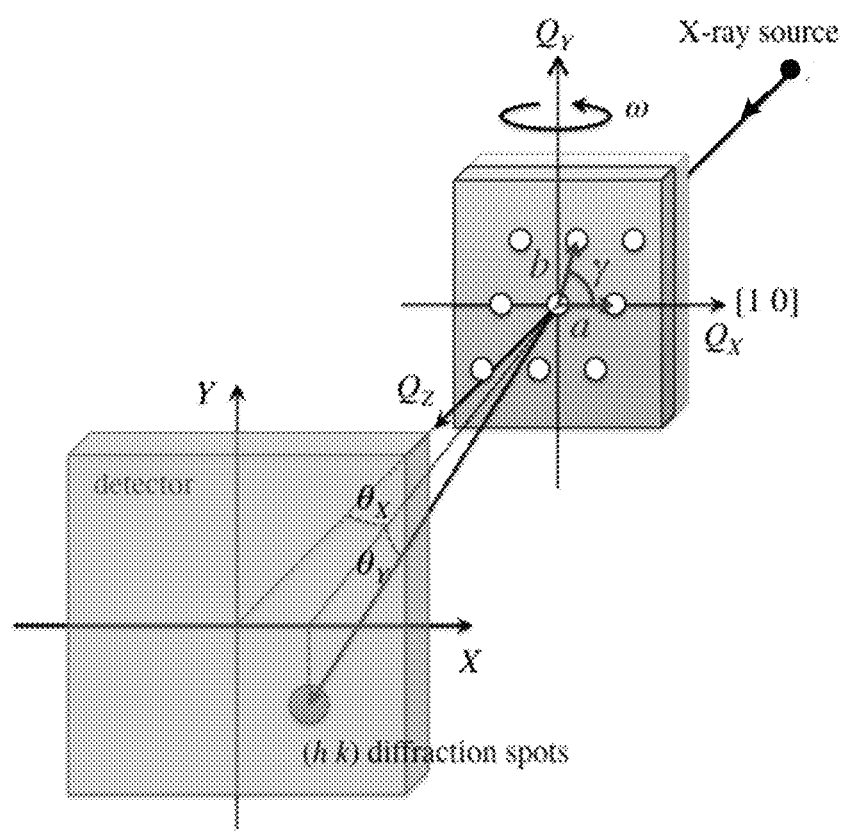
FIG. 1 is a perspective view showing a measurement system of transmission type CD-SAXS.

Next, embodiments of the present invention are described referring to the drawings. In order to facilitate understanding of the description, indicating the same constituent element is used as same and overlapping descriptions are omitted in each drawing.

[Basic Method]

According to the present invention, shapes of scattering bodies of a sample and so forth are analyzed by transmission type CD-SAXS executable at a laboratory level. Specifically, it is suitable for analyzing shapes of semiconductor devices with deep groove microfabrication patterns such as three-dimensional NAND and DRAM, and so forth. For example, it is possible to process scattering bodies such as holes each having a high aspect ratio fitted to specification for arrangements and diameters of scattering bodies, however it is difficult to control fitted to specification for tilt angles. Accordingly, measuring not only cross-sectional shapes of patterns but also tilt angles are highly demanded. If a simple sample model in which scattering bodies having a constant tilt angle are arranged is assumed, an efficient analysis for determining tilt angles becomes possible.

Specifically, the scattering intensity from a plate-shaped sample, that is generated via transmission of X-rays is measured for the plate-shaped sample formed to have columnar scattering bodies that are long in the thickness direction and periodically arranged, such as holes each having a high aspect ratio. First, a rotation position of a plate-shaped sample whose surface is perpendicular to an incident direction of X-rays is determined, based on measured scattering intensity data. Then, according to one method, tilt angles of scattering bodies are determined by specifying a normal line of a pattern expanse surface of the scattering bodies from the scattering intensity pattern (hereinafter, this is called "symmetric pattern measurement"). According to another method, the tilt angles of the scattering bodies are determined by a model analysis, with a length in the thickness direction of the scattering bodies as a known value (hereinafter, this is called "tilt model analysis").

The present invention is effective for nondestructively and simply measuring a deep groove fine pattern having a very large aspect ratio. It is specifically preferable when analyzing a structure buried in a substrate. As to shape measurement of deep groove patterns, the measurement is highly requested even for recent three-dimensional semiconductor devices, and can largely contribute to in-line measurements of the three-dimensional semiconductor devices if the present method is used. Next, specific embodiments are described.

[Transmission Type and Reflection Type]

FIG. 1 is a perspective view showing a measurement system of transmission type CD-SAXS. In the transmission type CD-SAXS, a sample rotation (ω rotation) is performed around a direction where X-rays perpendicularly enter a sample surface as a reference to measure sample rotation angle dependency of an integrated intensity for each diffraction line. It is because information in the depth direction is acquired by changing a scattering vector $Q_Z$ to perform the sample rotation {Refer to $Q_Z$ in Formula (1)}.

When there is a unit lattice having lattice constants represented by a and b and a grating angle represented by γ, the diffraction condition of diffraction indices (h, k) is given using scattering vectors $Q_X$, $Q_Y$ and $Q_Z$, as described below.

$$\begin{cases} Q_X = 2\pi \frac{h}{a} \\ Q_Y = 2\pi \left( -\frac{h}{a\tan\gamma} + \frac{k}{b\sin\gamma} \right) \\ Q_Z \approx -Q_X \tan\omega \end{cases} \quad (1)$$

Based on Formula (1), Formula (2) is obtained by determining $\Delta Q_Z$ when h=1.

$$\Delta Q_Z \approx \frac{2\pi}{a} \Delta \omega (h=1) \quad (2)$$

For example, for a semiconductor device, a corresponds to a pattern pitch, and is approximately 10 to 100 nm. Further, there is the following relationship between a depth H and a period $\Delta Q_Z$ of an interference pattern in the $Q_Z$ direction.

$$H = \frac{2\pi}{\Delta Q_Z} \quad (3)$$

Accordingly, $\Delta Q_Z$ needs to be small in order to measure a deep pattern.

On the other hand, according to a reflection type CD-SAXS, expected is a measurement system in which the scattering intensity is measured with a plate-shaped sample at a rotation angle β around a rotation axis φ perpendicular to the surface of the plate-shaped sample by making X-rays enter the surface of the plate-shaped sample at an grazing incident angle α. In this case, the diffraction condition is calculated as described below.

$$\begin{cases} Q_X = 2\pi \frac{h}{a} \\ Q_Y = 2\pi \left( -\frac{h}{a\tan\gamma} + \frac{k}{b\sin\gamma} \right) \\ Q_Z \approx \frac{2\pi}{\lambda} (\sin\alpha + \sin\beta) \end{cases} \quad (4)$$

Then, based on Formula (4), Formula (5) is obtained by determining $\Delta Q_Z$.

$$\Delta Q_Z \approx \frac{2\pi}{\lambda} \Delta \beta \quad (5)$$

Δβ is represented as described below by using a pixel size p and a camera length L.

$$\Delta \beta = \tan^{-1}\left(\frac{p}{L}\right) \quad (6)$$

The camera length L is generally 500 to 700 mm, and the typical pixel size is approximately 0.1 mm. The Δβ can be reduced by using a detector of a small pixel size.

Given that a is 10 to 100 nm in Formula (2) and a wave length λ of X-rays is approximately 0.1 nm in Formula (5), $\Delta Q_Z$ in a transmission type is 100 to 1000 times larger than $\Delta Q_Z$ in a reflection type. Accordingly, the transmission type measurement is effective for deep holes or deep grooves, and the reflection type measurement is effective for shallow holes or shallow grooves of the surface.

Characteristics of CD-SAXS of each of the transmission type and the reflection type are given as shown in the following table.

|  | Transmission type | Reflection type |
|---|---|---|
| Measurable depth | more than 200 nm | less than 200 nm |
| Preferable shape of hole/groove | a depth of 1 μm or more | a depth of 100 nm or less |
| Wavelength of applied X-rays | MoKα (0.071 nm) | CuKα (0.154 nm) |
| Refraction/reflection at interface | unaffected | affected |
| Lower layer pattern | affected | little affected |

In addition, in reflection type measurement with grazing angle incidence, no X-ray basically reaches the interface of a deep hole or a deep groove of several µm or more by absorption thereof. On the other hand, according to a transmission type method, X-rays are transmitted in the substrate.

[Principle of Symmetric Pattern Measurement]

As a method of simply determining tilt angles of scattering bodies such as holes, there is one carried out based on symmetry of the scattering intensity pattern obtained by transmitting X-rays in a plate-shaped sample, that is generated via the foregoing. For example, tilt angles of the scattering bodies can be determined based on a difference between a reference rotation position and a specific rotation position at which a scattering intensity pattern is symmetric. In this manner, the tilt angles of the pattern with respect to the surface is calculated by symmetry of the X-ray diffraction image.

For example, large aspect ratio deep holes each having a depth of several µm are processed with respect to a hole pitch of approximately 100 nm, for a silicon wafer. Then, when a pattern of a depth of several µm with respect to a hole diameter of 100 nm or less are formed, position displacement of the pattern is occurred at the bottom by slight difference in tilt angle.

Figure 3A:
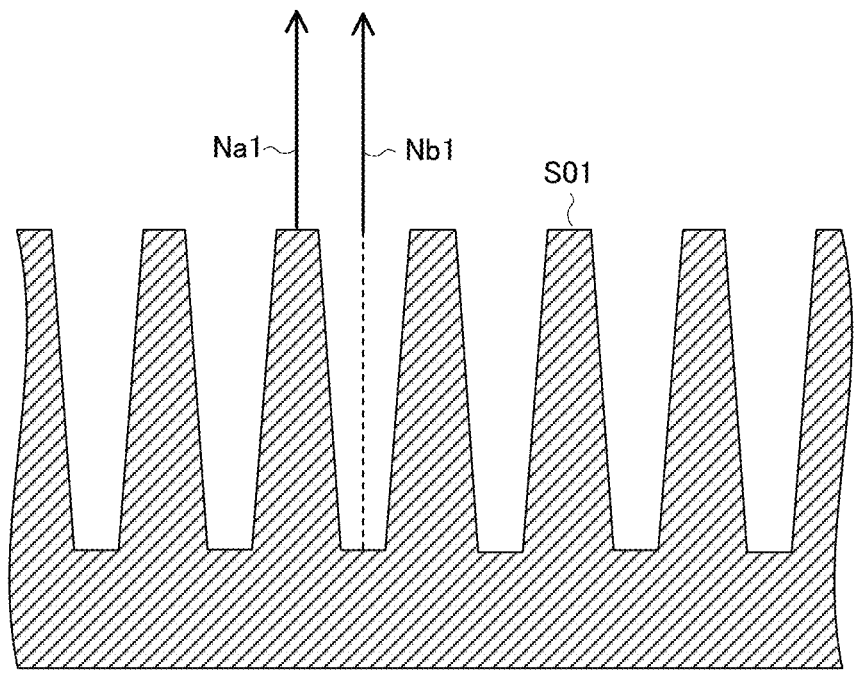
FIGS. 3A and 3B are sectional views showing respective samples each, onto the surface of which holes are vertically and obliquely processed.
Figure 3B:
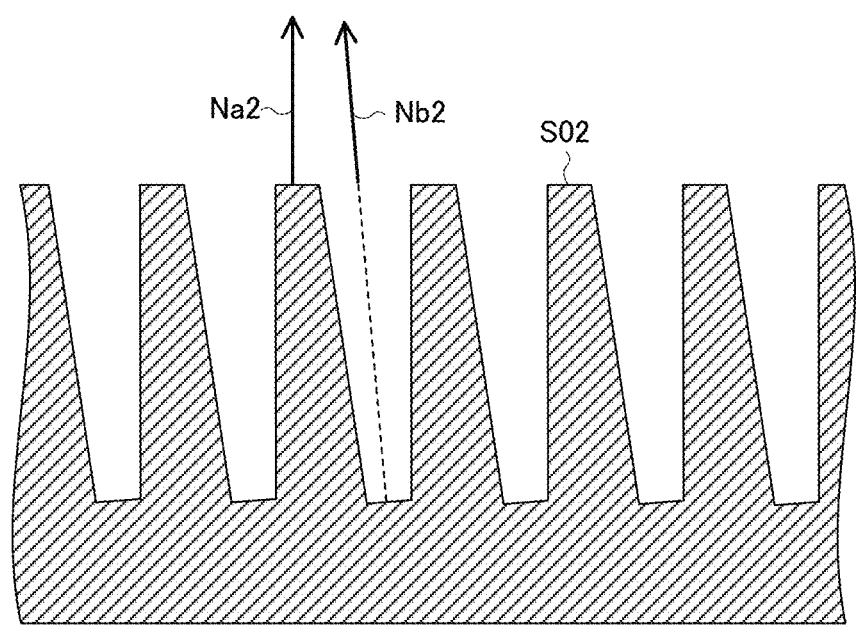

FIGS. 3A and 3B are sectional views showing respective samples S01 and S02 each, onto the surface of which holes are vertically and obliquely processed. In a sample S01 shown in FIG. 3A, a surface normal line Na1 and a pattern normal line Nb1 correspond with each other, however in a sample S02 shown in FIG. 3B, the surface normal line Na2 and the pattern normal line Nb2 are different from each other, and thus a hole tilt angle appears as an angle formed by each normal line.

With respect to such a silicon wafer, a laser beam is first arranged on an X-ray beam path, and a ω axis and a χ axis are adjusted so that the laser beam reflected on a sample surface may be aligned with the X-ray beam path. Then, a reference rotation position at which the laser beam reflected on the sample surface is aligned with the X-ray beam path is set to (ω, χ)=(ω0, χ0). Then, the ω axis and the χ axis are adjusted so that an X-ray small angle scattering pattern may be symmetrically observed, and the specific rotation position is set to (ω, χ)=(ω1, χ1).

In this manner, a deep hole pattern normal line is determined by specifying a position at which the X-ray small angle scattering pattern is symmetric while determining a wafer surface normal line via mirror surface reflection of laser beam, and a tilt angle is determined by differences (Δω, Δχ)=(ω1−ω0, χ1−χ0) of a normal vector. A degree at which the deep hole is able to be vertically processed, and a hole tilt angle distribution in a wafer plane (wafer) having a diameter of 300 mm thereof can be specified by applying the above-described method for each region.

Further, the specific rotation position (ω, χ)=(ω1, χ1) is preferably determined based on a plurality of rotation positions at each of which an intensity by a predetermined reflection surface forms a peak. For example, when as to a reflection surface (1 0), (ωa, χa) and (ωb, χb) are obtained as rotation positions of a plate-shaped sample, that form peaks in intensity, (ω1, χ1)={(ωa+ωb)/2, (χa+χb)/2} is obtained. In this manner, the specific rotation position at which the scattering intensity pattern is symmetric can be quickly determined in an objective manner.

Further, the specific rotation position (ω, χ)=(ω1, χ1) may be determined based on a rotation position at which a difference of the scattering intensities at the symmetric positions is equal to or lower than a reference value. For example, the center of the scattering intensity pattern is set to (0, 0); and the rotation position of a plate-shaped sample, at which |Ia−Ib|/Ia<0.01 is satisfied, can be set as a specific rotation position for an intensity Ia of a spot appearing at a pixel position of (100, 100) and an intensity Ib of a spot appearing at a pixel position of (−100, −100). Consequently, the specific rotation position at which the scattering intensity pattern is symmetric can be easily specified.

[Principle of Tilt Model Analysis]

(X-Ray Small Angle Scattering Intensity)

In transmission type CD-SAXS affected little by refraction or multiple reflections as described above, the X-ray small angle scattering intensity I(Q) can be calculated by Born approximation {the square of an absolute value of Fourier transformation of an electron number density distribution ρ (r) in the entire system}, as shown in Formula (7).

$$I(Q) = \left| \int_V \rho(r) e^{-iQ \cdot r} dr \right|^2 \quad (7)$$

Figure 2A:
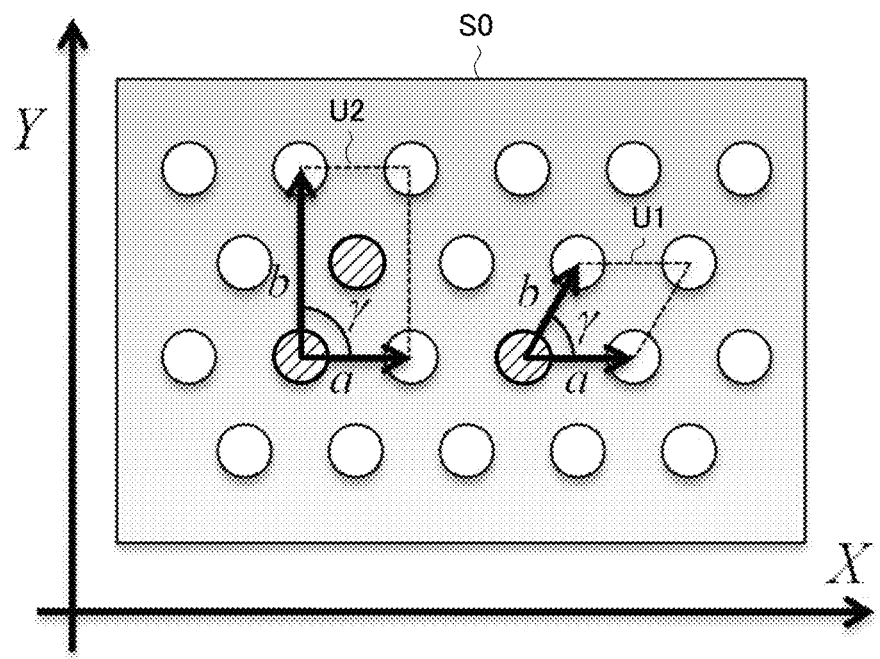
FIGS. 2A and 2B are an XY sectional view and an XZ sectional view each in which a plate-shaped sample is represented by an electron number density distribution, respectively.
Figure 2B:
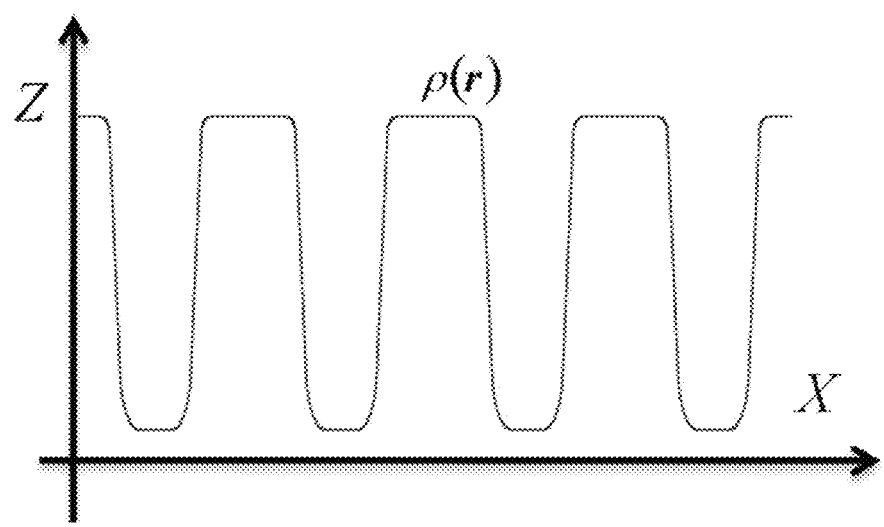

FIGS. 2A and 2B are respectively an XY sectional view and an XZ sectional view each in which a plate-shaped sample is represented by an electron number density distribution. As shown in FIGS. 2A and 2B, when scattering bodies have a structure of a periodical pattern, the amplitude of scattering X-rays can be expressed by the product of an integral concerning a unit lattice and a Laue function L, as shown in Formula (8).

$$\int_V \rho(r) e^{-iQ \cdot r} dr = \quad (8)$$

$$\int_{Unit\ cell} \rho(r) e^{-iQ \cdot r} dr \times \sum_{l,m}^{Surface} e^{-i(Q_X x_l + Q_Y y_m)} = \int_{Unit\ cell} \rho(r) e^{-iQ \cdot r}$$

$$dr \times \frac{\sin(N_X Q_X a/2) \sin(N_Y (Q_X \cos\gamma + Q_Y \sin\gamma) b/2)}{\sin(Q_X a/2) \sin((Q_X \cos\gamma + Q_Y \sin\gamma) b/2)} =$$

$$\int_{Unit\ cell} \rho(r) e^{-iQ \cdot r} dr \times L(Q)$$

Then, $Q_X$ and $Q_Y$ satisfying the diffraction condition are derived from Laue function.

$$\begin{cases} Q_X = 2\pi \dfrac{h}{a} \\ Q_Y = 2\pi \left( -\dfrac{h}{a \tan\gamma} + \dfrac{k}{b \sin\gamma} \right) \end{cases} \quad (9)$$

(How to Set a Unit Lattice)

As shown in FIG. 2A, the unit lattice may be set by a simple lattice U1 so as to minimize the area of the unit lattice, or may also be set by a lattice U2 that is easy to be set. In FIG. 2A, an independent site of each unit lattice is shown by a hatched circle. When each site having common electronic density distribution and shape, irrespective of the site, an integral within a unit lattice representing a scattering amplitude inside the unit lattice can be described by the product of a scattering body form factor F and a structure factor S as an integral of one scattering body.

$$\int_{Unit\,cell} \rho(r)e^{-iQ\cdot r}dr = \int_{Scatter} \rho(r)e^{-iQ\cdot r}dr \times \sum_{j}^{Unit\,cell} e^{-i(Q_X x_j + Q_Y y_j)} \quad (10)$$

$$= F(Q) \times S(Q)$$

The structure factor S can also be expressed as below, using Miller indices (h k) and relative coordinates ($x'_j$, $y'_j$) inside a unit lattice.

$$S(h, k) = \sum_{j}^{Unit\,cell} e^{-i2\pi(h\cdot x'_j + k\cdot y'_j)} \quad (11)$$

In the case of a simple lattice U1, the independent site is only (0, 0), and the structure factor is 1, irrespective of (h k). In the case of a face-centered lattice, independent sites are (0, 0) and (½, ½), and the structure factor becomes 2 when h+k is an even number and becomes 0 when h+k is an odd number. The Laue function L and the structure factor S are associated with the arrangement of scattering bodies, and are do not depend on shapes of the scattering bodies. Then, when the pattern structure of scattering bodies is determined by a mask pattern in such a semiconductor device, no pattern structure needs to be daringly determined by CD-SAXS. It is particularly important to specify shapes of scattering bodies {electron number density distribution r (r)} are determined.

The factor concerning shapes of the scattering bodies is none other than the form factor F that is a shape integral of the scattering bodies.

$$F(Q) = \int_{Scatter} \rho(r)e^{-iQ\cdot r}dr \quad (12)$$

form factor In the case that an electron number density distribution of each scattering body is a uniform electron number density $\rho_0$, the form factor F can also be replaced with the following form integral.

$$F(Q) = \rho_0 \int_{Scatter} e^{-iQ\cdot r}dr \quad (13)$$

For example, when a cylinder having a radius R and a length H stands in the Z direction, the form factor is given as below.

$$F(Q; R, H) = \quad (14)$$
$$\rho_0 \int_{-\frac{H}{2}}^{\frac{H}{2}} dz \int_0^R dr \int_0^{2\pi} re^{-i(Q_R r\cos\theta + Q_Z z)}d\theta = \frac{4\pi R}{Q_R Q_Z} J_1(Q_R R)\sin\left(\frac{Q_Z H}{2}\right)$$

$$\because Q_R = \sqrt{Q_X^2 + Q_Y^2}$$

There are many cases where actual scattering body shapes cannot be approximated by a simple shape such as a cylinder or the like. For example, it is possible to represent a form factor including the parameters by incorporating a side wall angle, a round parameter or the like into a shape model. Alternatively, it appears that a model-free analysis for performing analysis using a form factor obtained by incorporating only a diameter and a center position thereof into parameters for every slice layer by being sliced in the depth direction is effective.

In any case, shapes are not directly given from experimental data, but model parameters are refined to determine the shapes in such a manner that calculation data in which the model parameters are used as variables is identical with the experimental data.

$$\int_{Unit\,cell} \rho(r)e^{-iQ\cdot r}dr = \int_{Scatter} \rho(r)e^{-iQ\cdot r}dr \times \sum_{j}^{Unit\,cell} e^{-i(Q_X x_j + Q_Y y_j)} \quad (15)$$

$$= F(Q) \times S(Q)$$

$$\begin{cases} x_j = \bar{x}_j + \Delta x \\ y_j = \bar{y}_j + \Delta y \end{cases} \quad (16)$$

$$\sum_{j}^{Unit\,cell} e^{-i(Q_X x_j + Q_Y y_j)} \to \sum_{j}^{Unit\,cell} e^{-i(Q_X(\bar{x}_j + \Delta x) + Q_Y(\bar{y}_j + \Delta x))} = \quad (17)$$

$$e^{-i(Q_X \Delta x + Q_Y \Delta y)} \sum_{j}^{Unit\,cell} e^{-i(Q_X \bar{x}_j + Q_Y \bar{y}_j)} =$$

$$\left(\int_{-\infty}^{\infty} e^{-iQ_X x} \frac{1}{\sqrt{2\pi}\sigma_X} e^{-\frac{1}{2}\left(\frac{x}{\sigma_X}\right)^2} dx\right)$$

$$\left(\int_{-\infty}^{\infty} e^{-iQ_Y y} \frac{1}{\sqrt{2\pi}\sigma_Y} e^{-\frac{1}{2}\left(\frac{y}{\sigma_Y}\right)^2} dy\right) \sum_{j}^{Unit\,cell} e^{-i(Q_X \bar{x}_j + Q_Y \bar{y}_j)} =$$

$$e^{-\frac{1}{2}(\sigma_X^2 Q_X^2 + \sigma_Y^2 Q_Y^2)} \sum_{j}^{Unit\,cell} e^{-i(Q_X \bar{x}_j + Q_Y \bar{y}_j)}$$

In Formula (17), the factor represented by the sum symbols for the unit cell corresponds to a structure factor S(Q) {Refer to Formula (15)}. On the other hand, a temperature factors by thermal vibration in crystallography correspond to the integral terms in the X-direction and the Y-direction in Formula (17), and correspond to a part shown in Formula (18).

$$e^{-\frac{1}{2}(\sigma_X^2 Q_X^2 + \sigma_Y^2 Q_Y^2)} \quad (18)$$

When representing a pattern shape, this factor represents statically positional fluctuation. A model analysis for specifying parameters such as shapes of scattering bodies, the positional fluctuation and so forth is made possible by using a formula representing an X-ray scattering intensity with transmission type CD-SAXS, that is determined as described above.

According to the model analysis, shapes and arrangements of scattering bodies can be simply determined by fitting. In that case, parameters including tilt angles of the scattering bodies can be determined. Specifically, a laser beam is first arranged on an X-ray beam path, and the ω axis and the χ axis are adjusted so that the laser beam reflected on the sample surface may be aligned with the X-ray beam path, thereby finding out a reference of a thin film surface.

Calculating a scattering intensity of X-rays via the sample model is carried out by assuming a sample model in which the scattering bodies are periodically arranged in a direction parallel to the surface of a plate-shaped sample with a length in the thickness direction of the scattering bodies as a known value to fit the calculated scattering intensity to the generated scattering intensity. In this case, tilt angles $\Delta\omega$ and $\Delta\chi$ of the scattering bodies are specifically included in analysis parameters. In this manner, tilt angles ($\Delta\omega$, $\Delta\chi$) and average diameters $D_X$ and $D_Y$ in the X-direction and the Y-direction, and disturbance parameters $\sigma_P$ as shape parameters can be calculated.

The relationship between the scattering vector and the tilt angles is as follows.

$$\begin{cases} Q_X = 2\pi \dfrac{h}{a} \\ Q_Y = 2\pi \left( -\dfrac{h}{a\tan\gamma} + \dfrac{k}{b\sin\gamma} \right) \\ Q_Z \approx -Q_X \tan\Delta\omega - Q_Y \tan\Delta\chi \end{cases} \quad (19)$$

Further, the scattering intensity formula for a cylinder model is as follows.

$$I(Q; D_X, D_Y, H, \sigma_P) = |F(Q; D_X, D_Y, H)|^2 e^{-\sigma_P^2(Q_X^2 + Q_Y^2)} \quad (20)$$

$$F(Q) = 2\pi D_Y \frac{J_1\left(\dfrac{D_X}{2} Q_R^*\right)}{Q_R^*} \frac{\sin\left(\dfrac{H}{2} Q_Z\right)}{Q_Z}$$

$$Q_R^* = \sqrt{Q_X^2 + \left(\dfrac{D_Y}{D_X}\right)^2 Q_Y^2}$$

In addition, since no height (depth) H can be analyzed, a designed value (fixed value) is input. Optimum values of tilt angles of the scattering bodies can be determined from the fitting result. In this manner, the tilt angles of the scattering bodies can be easily determined by fitting using a sample model. In addition, when the scattering bodies are circular columns, boundary thereof are cylindrical, and thus the cylinder model can be applied thereto.

[Configuration of the Entire System]

Figure 4:
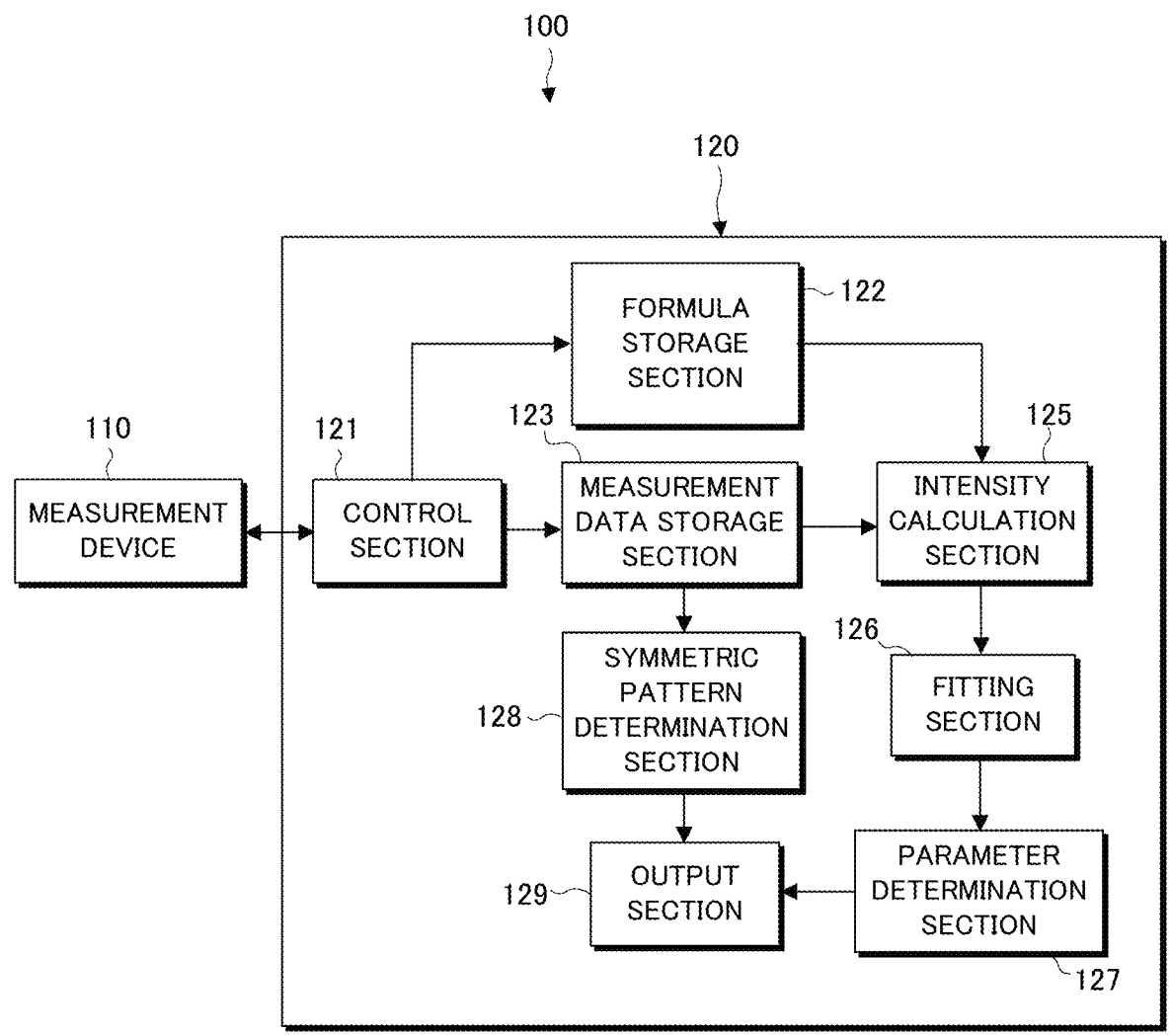
FIG. 4 is a block diagram showing a configuration of a measurement system according to the present invention.

FIG. 4 is a block diagram showing a configuration of a measurement system 100. The measurement system 100 comprises a measurement device 110 and an analysis apparatus 120, enables a transmission type CD-SAXS measurement via measurement of a scattering intensity by irradiating X-rays to a plate-shaped sample. The analysis apparatus 120 manages measurement data together with control data while controlling the measurement device 110, and enables analyzing the data. The specific configuration is described below.

[Configuration of Measurement Device]

Figure 5:
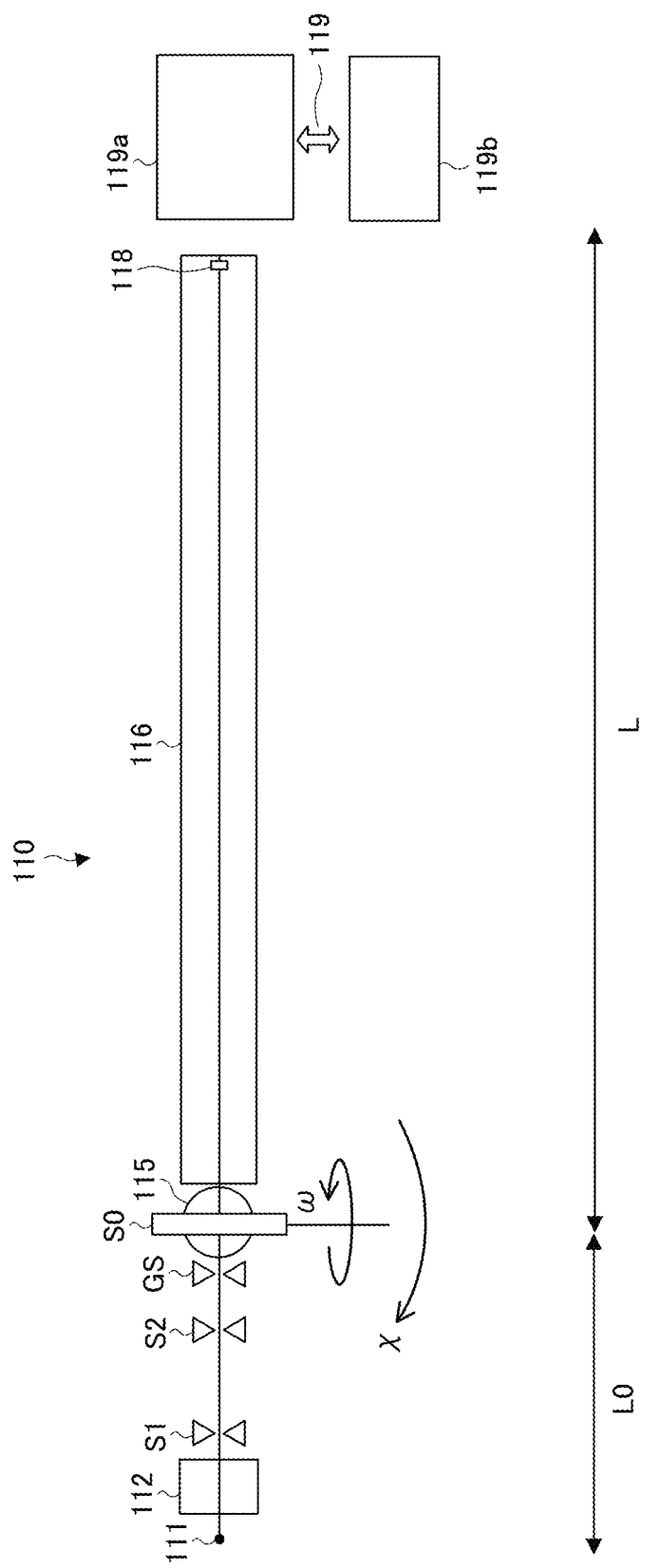
FIG. 5 is a plan view showing a configuration of a measurement device.

FIG. 5 is a plan view showing a configuration of the measurement device 110. The measurement device 110 comprises an X-ray source 111; a mirror 112; slits S1, S2 and GS; a sample stage 115; a vacuum path 116, a beam stopper 118; a switching mechanism 119, a detector 119a, and a laser beam source 119b. The distance L0 from X-ray source 111 to the sample S0, and the camera length L can be set to, for example, 1000 mm and 3000 mm, respectively.

MoKα is usable as an X-ray source 111. The mirror 112 spectrally diffracts X-rays radiated from the X-ray source 111, and the spectrally diffracted X-rays are radiated in the direction of a sample S0. The slits S1 and S2 each made from a member capable of shielding X-rays constitutes a slit section for narrowing the spectrally diffracted X-rays. According to such a configuration, it becomes possible to radiate X-rays at a plurality of rotation angles ω close to the direction perpendicular to the surface of the plate-shaped sample S0. As the plurality of rotation angles ω, specific angles in the range between −10° and 10° are preferably selected. According to the slit GS, a spot size of X-rays on the sample surface can be limited to several ten μm or less. Basically, parasitic scattering generated at the slits S1 and S2 is eliminated using the slit GS by determining the beam size at the slits S1 and S2. However, in the case of producing an extremely small spot, it is also possible to make the beam small at the slit GS.

The sample stage 115 supporting the sample S0 on the stage is able to adjust the direction of the plate-shaped sample S0 via a drive mechanism by receiving control of the analysis apparatus 120. Specifically, not only ω rotation angles around $Q_Y$ as shown in FIG. 1 but also a χ rotation angle and a ϕ rotation angle is adjustable. The angle at which spectrally diffracted X-rays are incident on the sample S0 can be changed by such an adjustment, and thus the scattering intensity can be measured according to the diffraction angle.

The sample S0 is formed into a plate shape, and scattering bodies are periodically arranged in the direction parallel to the main surface of the sample. For example, holes are exemplified as scattering bodies. That is, a typical sample is a silicon wafer substrate, in this case, the scattering bodies are holes that have been formed by etching. As the integration degree becomes higher, it is important to confirm formation of more accurate hole shape with respect to the specification.

In such a case, even though the scattering bodies have a length of 200 nm or more and 20 μm or less, shapes of the scattering bodies that are long in the thickness direction can be specified by radiating the X-rays perpendicularly to the sample surface, as shown in FIG. 5 and utilizing scattering accompanied with transmission of the X-rays.

The scattering bodies may be formed as pillars without limiting to the above-described holes. That is, the present invention can also be applied to a sample of a silicon substrate, on the surface of which circle columns are periodically formed. Further, a sample on which line patterns (space patterns) like long molecular arrangement are formed may be used.

By the vacuum path 116, the path of a scattering beam is maintained in vacuum while gaining the camera length, in order to suppress attenuation of the scattering beam. The beam stopper 118 absorbs the direct beam. The detector 119a that is a two-dimensional semiconductor detector movable on the circumference from a sample position, for example, can detect the scattering intensity of X-rays. The measurement device 110 and the analysis apparatus 120 are connected to each other, and the detected scattering intensity data is transmitted to the analysis apparatus 120. The switching mechanism 119 that receives the instruction of switching control is possible to be arranged by replacing the laser beam source 119b with the detector 119a.

The laser beam source 119b is possible to detect reflection light while generating laser beam. Further, it is possible that the measurement device 110 adjusts azimuth of a plate-shaped sample in such a manner that the surface of the plate-shaped sample becomes perpendicular to the incident direction of X-rays by using reflection of the laser beam. The azimuth adjusted in this manner can be used as a reference, resulting in ω=χ=0° in this case. In addition, the measurement device 110 comprises the switching mechanism 119, however may be constituted so as to be arranged by replacing one of the detector 119a and the laser beam source 119b with the other without having the switching mechanism 119.

Even though there is no reference when the cross-sectional shape of a sample is evaluated, analysis itself can be performed. However, an appropriate origin for an ω axis and a χ axis of geometer axes is merely used as a reference for the cross-sectional shape specified with no reference. In many cases of evaluating the cross-sectional shape, the cross-sectional shape needs to be evaluated by using the surface as a reference. In such a case, it is preferable that a reference for the surface is provided, and the measurement and analysis are subsequently performed.

[Configuration of Analysis Apparatus]

The analysis apparatus 120 constituted from PC provided with for example, a memory and a processor enable performing each processing by executing a program. It is made possible to determine or analyze a fine structure of a plate-shaped sample formed to have scattering bodies that are long in the thickness direction and periodically arranged by processing measurement data obtained from the measurement device 110. The analysis apparatus 120 comprises a control section 121, a formula storage section 122, a measurement data storage section 123, an intensity calculation section 125, a fitting section 126, a parameter determination section 127, a symmetric pattern determination section 128, and an output section 129.

The control section 121 that controls the measurement device 110 manages the control data and the measurement data. For example, the control section 121 controls the sample stage 115 with the drive mechanism, and adjusts azimuth of the sample S0. The formula storage section 122 stores the formula for calculating the scattering intensity with respect to the specific shape model or analysis condition. The measurement data storage section 123 stores intensity data of X-rays scattered from the plate-shaped sample by transmission of X-rays, that is measured at each of a plurality of rotation angles ω in the vicinity of the direction perpendicular to the surface of a plate-shaped sample.

The intensity calculation section 125 acquires the formula for calculating scattering with respect to a desired shape model or an analysis condition from the formula storage section 122 on the one hand, and calculates the scattering intensity of X-rays by selecting values of various parameters obtained from existing parameters on the other hand. The scattering intensity of X-rays scattered by a plate-shaped sample under the specific condition can be calculated by using the acquired formula.

Fitting a scattering intensity calculated by the intensity calculation section 125 to a scattering intensity of X-rays actually measured by the measurement device 110 is performed by the fitting section 126. The fitting section 126 confirms whether or not the fitting having been performed is optimum, and when not being optimum, the scattering intensity is made to be calculated again via simulation by changing parameters.

The parameter determination section 127 determines the parameters of scattering bodies of a plate-shaped sample using the result obtained by fitting. In this manner, shapes of the scattering bodies that are long in the thickness direction can be determined. Specifically, determined can be the tilt angles of scattering bodies in the plate-shaped sample with respect to a reference rotation position at which the surface of the plate-shaped sample is perpendicular to the incident direction of X-rays.

The symmetric pattern determination section 128 determines whether or not the scattering intensity pattern is symmetric, and outputs a rotation position of a sample as a specific rotation position when it is determined to be symmetric. The specific rotation position can be determined based on a plurality of rotation positions at each of which the intensity by a predetermined reflection surface forms a peak. Further, the specific rotation position may be determined based on a rotation position at which a difference of the scattering intensities at the symmetric positions is equal to or lower than a predetermined reference value.

The output section 129 displays the measured scattering intensity pattern. Further, the output section 129 displays shapes of the determined scattering bodies. In this case, displaying for which a tilt angle distribution is shown on a plan view of a sample may be carried out. In addition, as to the pattern symmetry, according to the present embodiment, it is based on the premise that the determination is automatically made by a device, but it is also possible to be determined by a user by visually observing the scattering intensity pattern displayed at the output section 129.

[Measurement Method for Symmetric Pattern]

Figure 6:
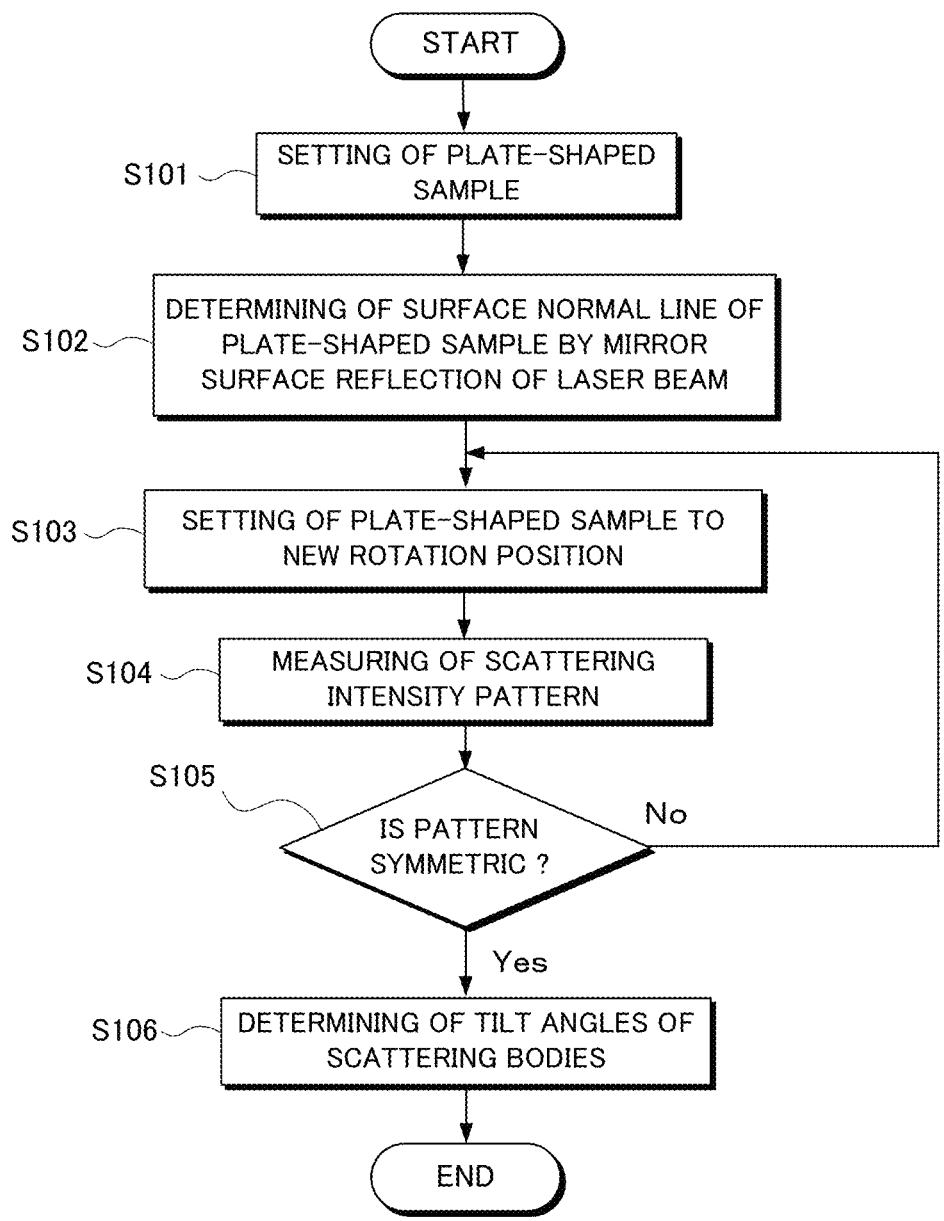
FIG. 6 is a flowchart showing a measurement method for a symmetric pattern.

The measurement method for a symmetric pattern using a configuration of the above-described system is described. FIG. 6 is a flowchart showing a measurement method for a symmetric pattern. As shown in FIG. 6, a plate-shaped sample is first set onto a sample stage in the measurement device 110 (step S101). Next, the laser beam source is arranged on the X-ray beam path; a normal line of the surface on the plate-shaped sample is determined by detecting the mirror surface reflection of laser beam (step S102); and switching is performed in such a manner that the detector is arranged at the installation position of the laser beam source. Next, the plate-shaped sample is set to a new rotation position by controlling the measurement device 110 (step S103). This control is preferably performed automatically, but may be manually performed. The scattering intensity pattern is measured at this rotation position (step S104).

The measured scattering intensity data is transmitted to the analysis apparatus 120, and is processed. The analysis apparatus 120 determines whether or not the scattering intensity pattern is symmetric (step S105), followed by returning to the step S103 when the scattering intensity pattern is not symmetric. When the scattering intensity pattern is symmetric, the tilt angles of scattering bodies are determined from the difference between this rotation position and a reference rotation position (step S106), followed by ending a series of procedures via outputting of the result.

[Analysis Method for Tilt Model]

Figure 7:
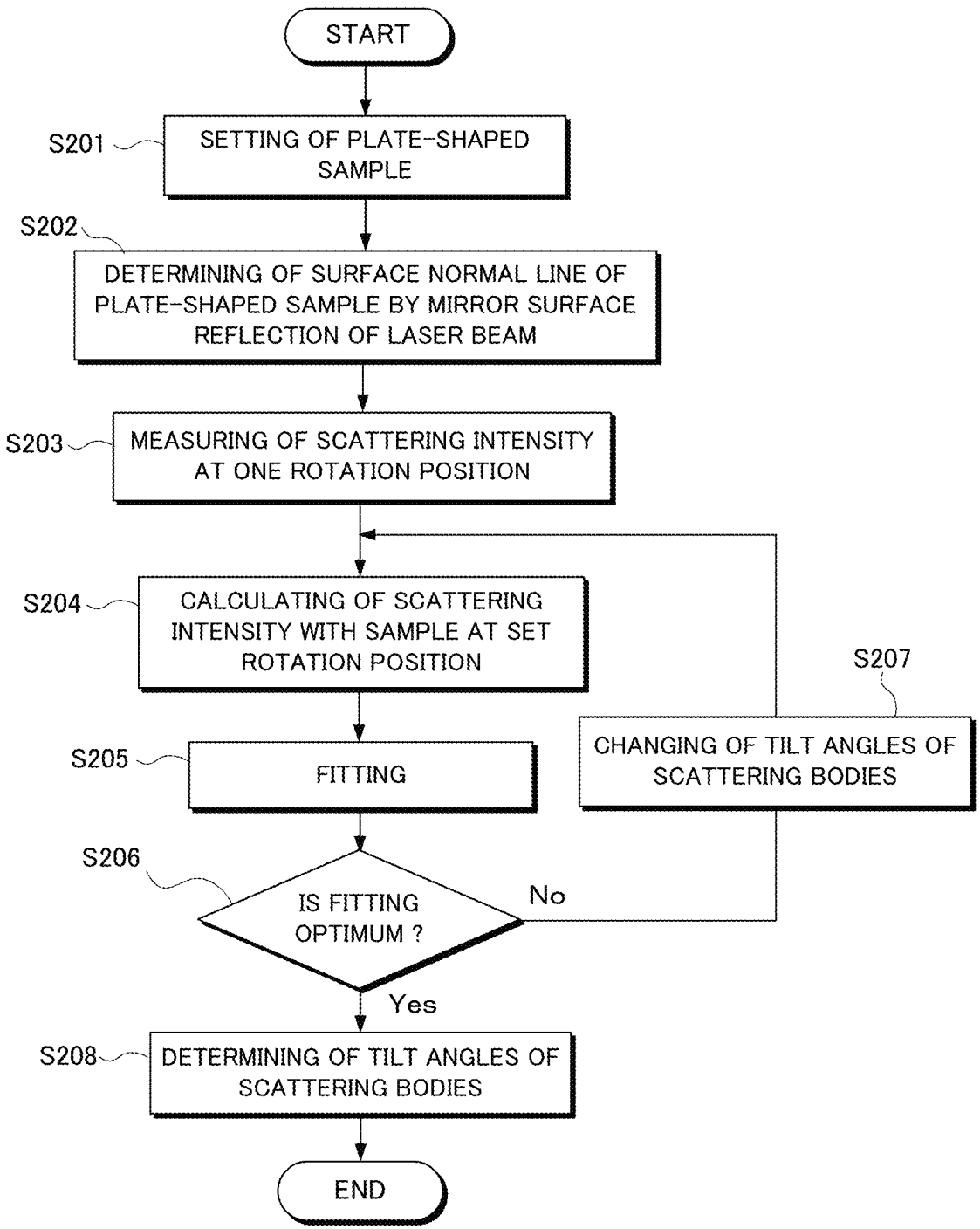
FIG. 7 is a flowchart showing an analysis method for a tilt model.

Next, the analysis method for a tilt model using a configuration of the above-described system is described. FIG. 7 is a flowchart showing an analysis method for a tilt model. As shown in FIG. 7, a plate-shaped sample is first set onto a sample stage in the measurement device 110 (step S201). Then, next, the laser beam source is arranged on the X-ray beam path; a surface normal line of the plate-shaped sample is determined by detecting the mirror surface reflection of laser beam (step S202); and switching is performed in such a manner that the detector is arranged at the installation position of the laser beam source. Then, the scattering intensity at one sample rotation position is measured (step S203).

The measured scattering intensity data is transmitted to the analysis apparatus 120, and is processed. The analysis apparatus 120 calculates the scattering intensity of X-rays under the condition of a specific shape model by assuming parameters such as shapes and tilt angles of scattering bodies (step S204). Then, fitting the calculated scattering intensity to the measured scattering intensity is carried out (step S205). Whether or not the performed fitting is optimum is confirmed (step S206), and when not being optimum, the parameters are changed (step S207), followed by returning to the step S204. When the fitting is optimum, the parameters in which tilting of scattering bodies is included are determined by values at that time (step S208), followed by ending a series of procedures.

EXAMPLE

As to a sample of a semiconductor substrate, to the surface of which holes long in the depth direction are periodically arranged in the parallel direction, the scattering intensity of X-rays is measured by transmission type CD-SAXS to specify patterns via the symmetric pattern measurement and tilt model analysis.

(Example of Symmetric Pattern Measurement)

Figure 8A:
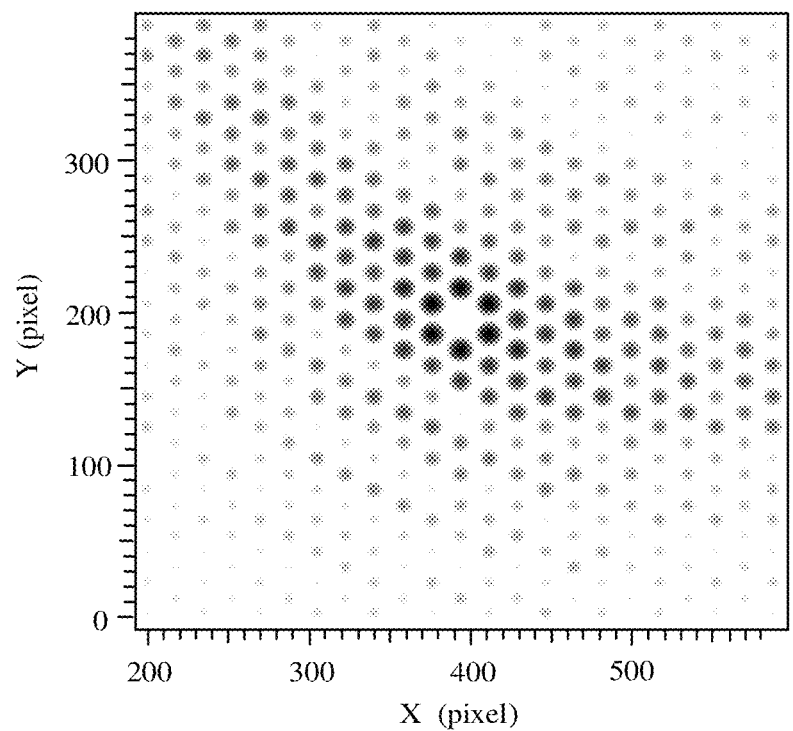
FIGS. 8A and 8B are diagrams showing respective pieces of scattering intensity data measured by making X-rays be incident along a sample surface normal line and a hole pattern normal line.

First, the surface normal line of a plate-shaped sample is determined by mirror surface reflection of laser beam. Specifically, the laser beam is arranged on an X-ray beam path, and the ω axis and the χ axis are adjusted so that the laser beam reflected on the sample surface may be aligned with the X-ray beam path to bring out a reference for the thin film surface. The scattering intensity pattern is measured at a rotation position of the sample at ω=χ=0°. FIG. 8A is a diagram showing the scattering intensity data measured by making X-rays be incident along the sample surface normal line. As shown in FIG. 8A, the scattering intensity pattern at ω=χ=0° is asymmetric.

Figure 8B:
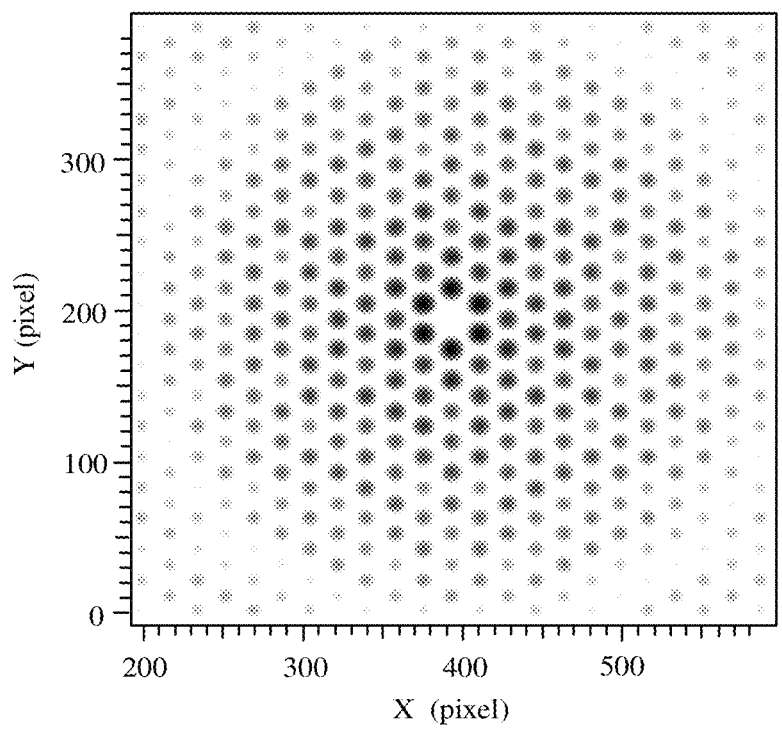

Next, the rotation position of the plate-shaped sample is changed to measure the scattering intensity data, and specified is the rotation position at (Δω, Δχ)=(0.3°, 0.6°) where the scattering intensity pattern becomes symmetric. FIG. 8B is a diagram showing the scattering intensity data measured by making X-rays be incident along a hole pattern normal line. As shown in FIG. 8B, the scattering intensity pattern at (Δω, Δχ)=(0.3°, 0.6°) is symmetric. A difference of (Δω, Δχ)=(0.3°, 0.6°) between this rotation position and the reference rotation position is obtained as each tilt angle of the scattering bodies.

(Example of Tilt Model Analysis)

Figure 9A:
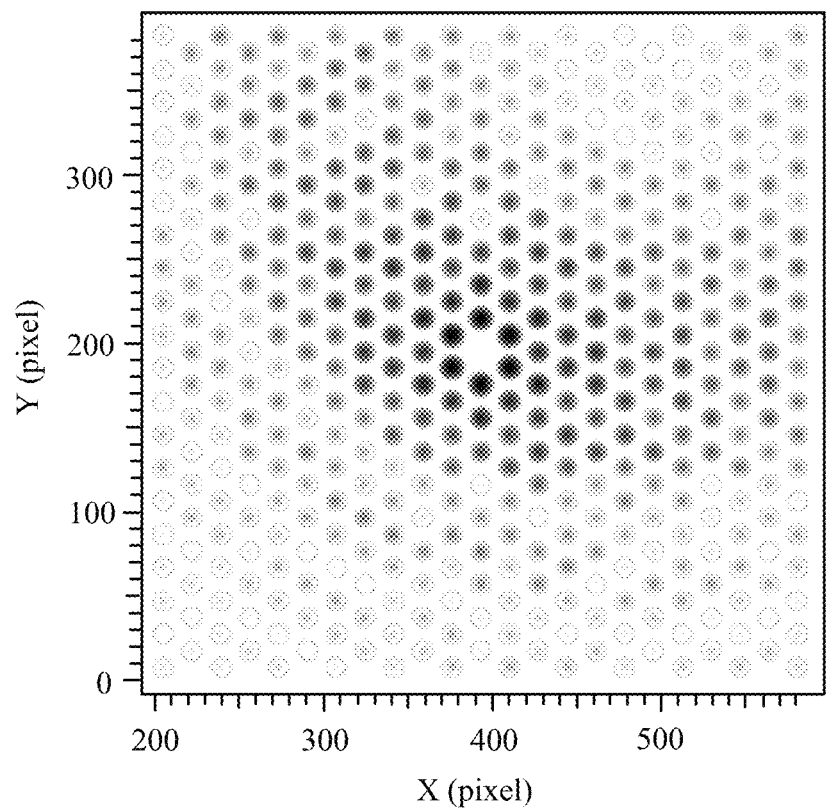
FIGS. 9A, 9B and 9C are diagrams showing measured scattering intensity data, a fitting result in the scattering vector $Q_R$ direction using a shape model, and the resulting parameters, respectively.

First, the surface normal line of a plate-shaped sample is determined by the mirror surface reflection of laser beam. Then, the scattering intensity at one rotation angle is measured. FIG. 9A is a diagram showing the measured scattering intensity data. On the other hand, the scattering intensity of X-rays is calculated by a sample model in which cylindrical scattering bodies obtained by assuming parameters such as shapes and tilt angles are periodically arranged.

Figures 9B, 9C:
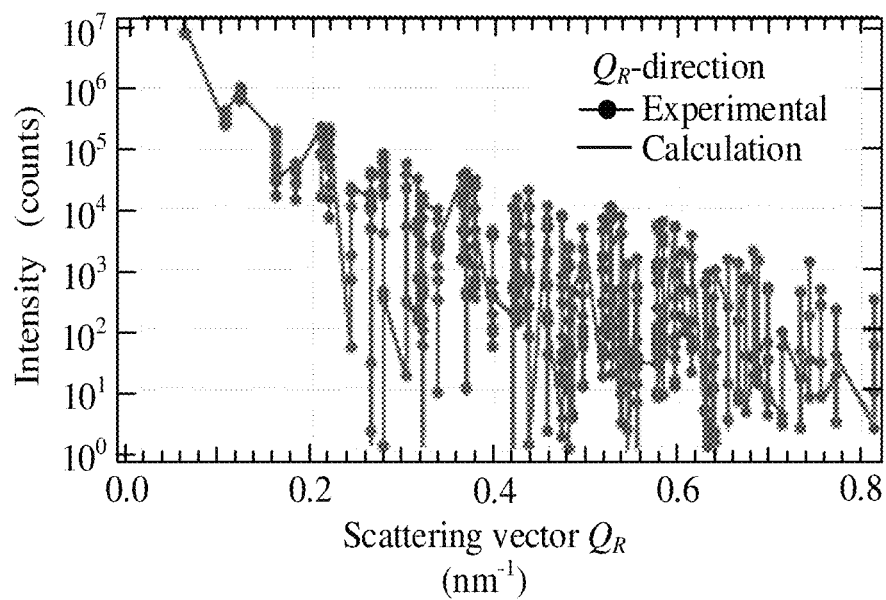

Fitting the calculated scattering intensity to the measured scattering intensity is carried out, and the parameters in which tilting of scattering bodies is included are determined by the values when being optimum. FIG. 9B is a diagram showing the fitting result in the scattering vector $Q_R$ direction using a shape model. Further, FIG. 9C is a diagram showing the resulting parameters.

Figure 10A:
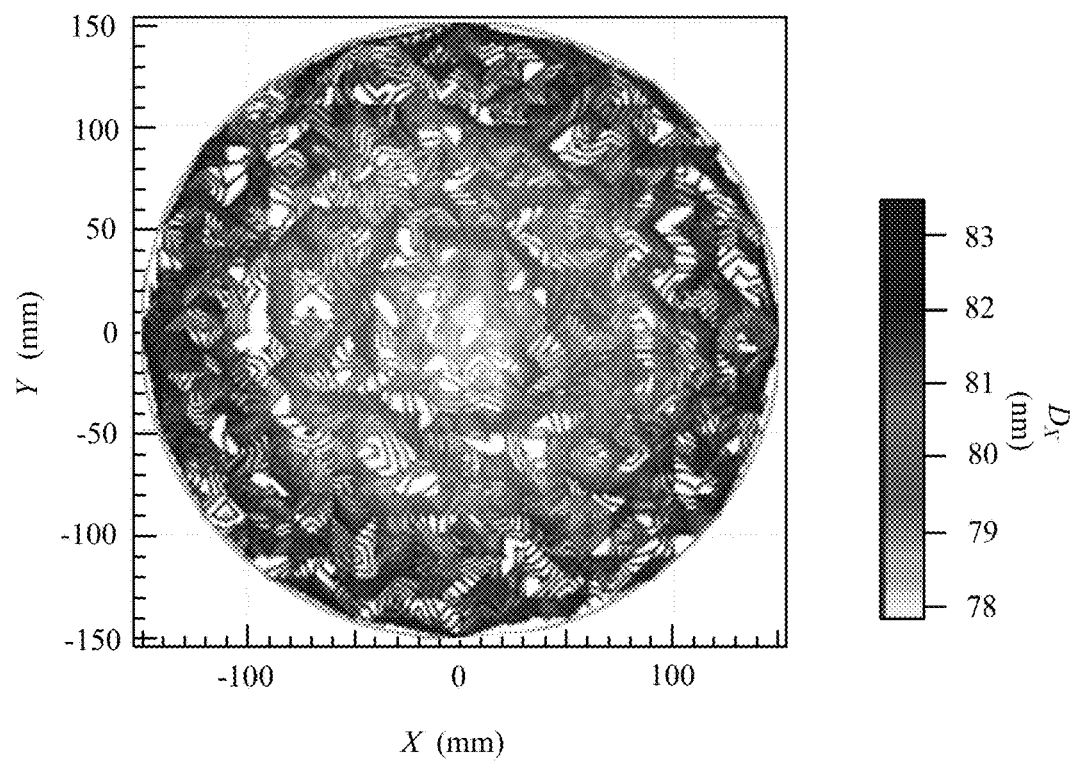
FIGS. 10A and 10B are diagrams in which average hole diameters in the sample surface are mapped in the X-direction and the Y-direction, respectively.
Figure 10B:
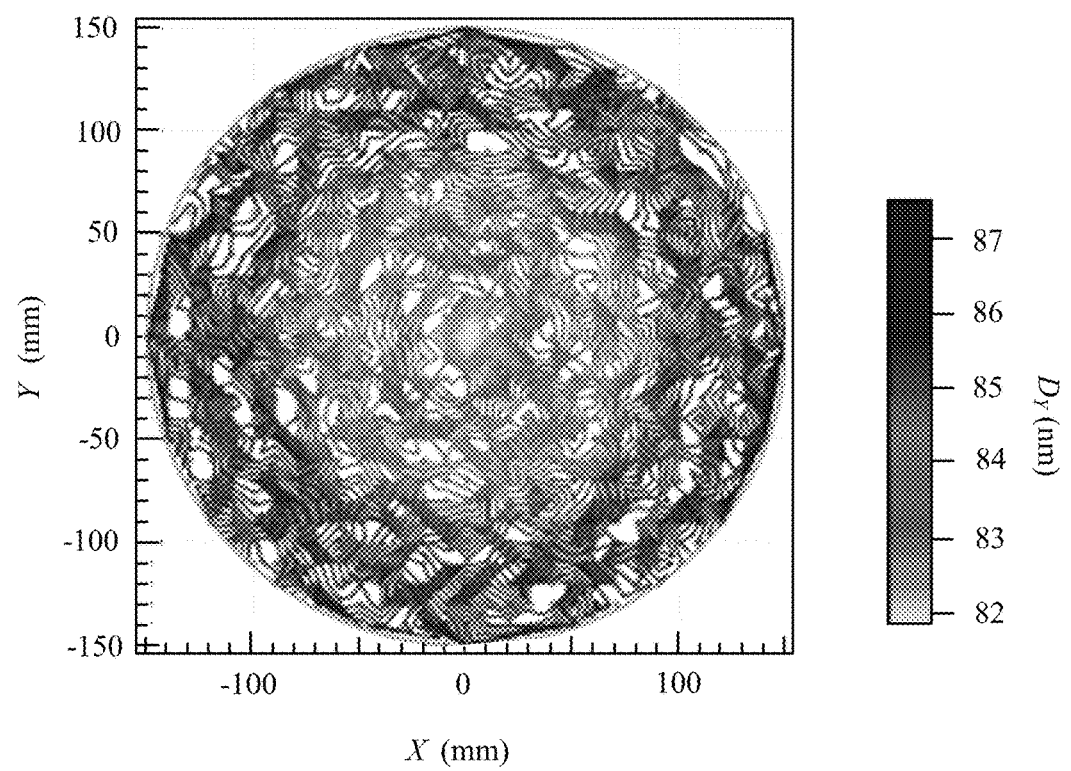

Meaning of each parameter is as follows.
(1) $D_X$: Average hole diameter in the X-direction
(2) $D_Y$: Average hole diameter in the Y-direction
(3) $\sigma_P$: Hole pitch variation
(4) Δω: Tilt angle in the X-direction
(5) Δχ: Tilt angle in the Y-direction The regions obtained by dividing the sample into 709 parts are subjected to analyzing as described above. As a result of this, the average hole diameters and tilt angles in the sample surface can be mapped, respectively. FIGS. 10A and 10B are diagrams in which average hole diameters in the sample surface are mapped in the X-direction and the Y-direction, respectively. As shown in FIGS. 10A and 10B, it is understood that average hole diameters in any direction are small around the center of the sample, and are large on the outer circumferential side of the sample.

Figure 11A:
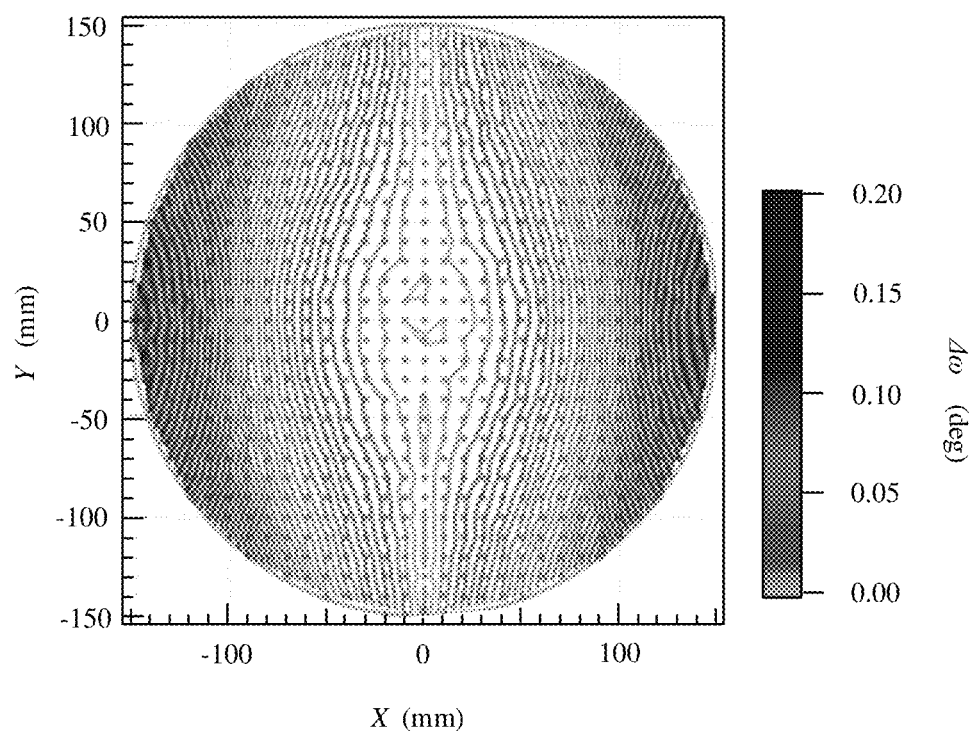
FIGS. 11A and 11B are diagrams in which tilt angles of holes in the sample surface are mapped in the ω direction and the χ direction, respectively.
Figure 11B:
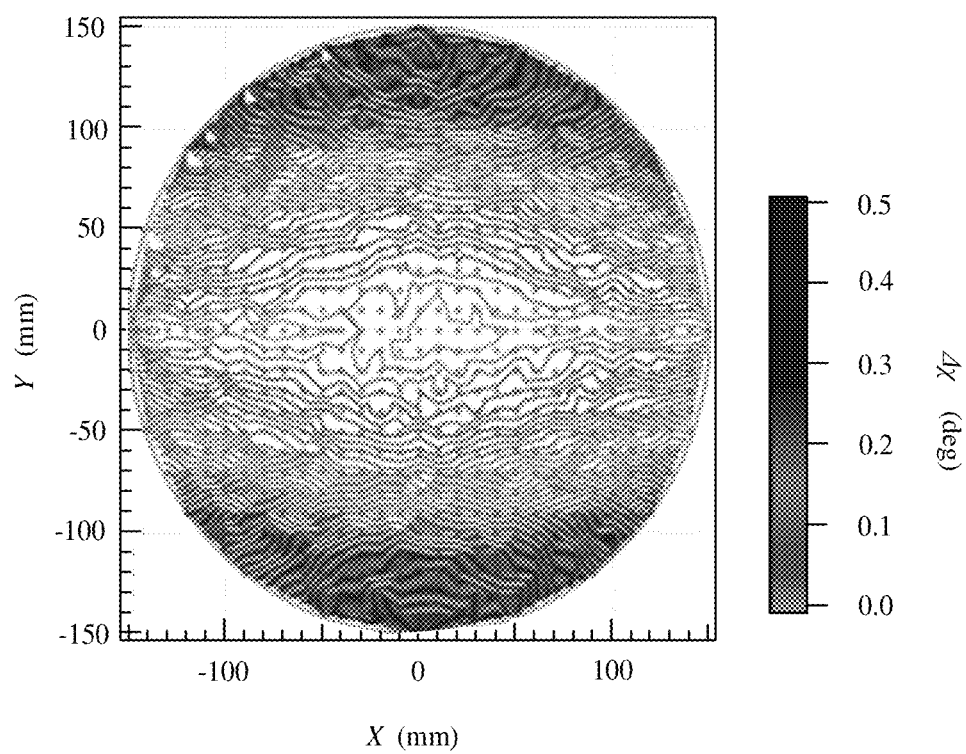

FIGS. 11A and 11B are diagrams in which tilt angles of holes in the sample surface are mapped in the ω direction and the χ direction, respectively. As shown in FIG. 11A, the tilt angle Δω in the X-direction is 0° around the center, and becomes large to 0.20° on each of the plus side and the minus side in the X-direction. Further, as shown in FIG. 11B, the tilt angle Δχ in the Y-direction is 0° around the center, and becomes large to 0.50° on each of the plus side and the minus side in the Y-direction.

EXPLANATION OF THE SYMBOLS

110 Measurement device
111 X-ray source
112 Mirror
115 Sample stage
116 Vacuum path
118 Beam stopper
119 Switching mechanism
119a Detector
119b Laser beam source
120 Analysis apparatus
121 Control section
122 Formula storage section
123 Measurement data storage section
125 Intensity calculation section
126 Fitting section

The invention claimed is:

1. A determination method for a fine structure of a plate-shaped sample formed to have columnar scattering bodies that are long in a thickness direction and periodically arranged, comprising the steps of:
preparing scattering intensity data from the plate-shaped sample, that is generated via transmission of X-rays; and
determining tilt angles of the scattering bodies in the plate-shaped sample with respect to a reference rotation position at which a surface of the plate-shaped sample is perpendicular to an incident direction of the X-rays, based on the prepared scattering intensity data, wherein
the reference rotation position is adjusted so that the laser beam reflected on the surface of the plate-shaped sample is aligned with the X-ray beam path.

2. The determination method according to claim 1, wherein the tilt angles of the scattering bodies are determined based on a difference between the reference rotation position and a specific rotation position at which a pattern of the prepared scattering intensity is symmetric.

3. The determination method according to claim 2, wherein the specific rotation position is determined based on a plurality of rotation positions at each of which an intensity by a predetermined reflection surface forms a peak.

4. The determination method according to claim 1, wherein the step of determining the tilt angles of the scattering bodies further comprises:
a step of calculating a scattering intensity of X-rays via the sample model by assuming a sample model in which the scattering bodies are periodically arranged in a direction parallel to a surface of the plate-shaped sample with a length in the thickness direction of the scattering bodies as a known value to fit the calculated scattering intensity to the generated scattering intensity, and a step of determining optimum values of the tilt angles of the scattering bodies from the fitting result.

5. The determination method according to claim 1, wherein the plate-shaped sample is formed of silicon, and the scattering bodies each have a length of 200 nm or more and 20 µm or less.

6. A determination method for a fine structure of a plate-shaped sample formed to have columnar scattering bodies that are long in a thickness direction and periodically arranged, the method comprising the steps of:

preparing scattering intensity data from the plate-shaped sample, that is generated via transmission of X-rays; and determining tilt angles of the scattering bodies in the plate-shaped sample with respect to a reference rotation position at which a surface of the plate-shaped sample is perpendicular to an incident direction of the X-rays, based on the prepared scattering intensity data, wherein the tilt angles of the scattering bodies are determined based on a difference between the reference rotation position and a specific rotation position at which a pattern of the prepared scattering intensity is symmetric, and wherein the specific rotation position is determined based on a rotation position at which a difference of the scattering intensities at the symmetric positions is equal to or lower than a predetermined reference value.

7. An analysis apparatus for a fine structure of a plate-shaped sample formed to have columnar scattering bodies that are long in a thickness direction and periodically arranged, comprising:

a measurement data storage section that stores scattering intensity data, that is generated from the plate-shaped sample via transmission of X-rays; and a parameter determination section that determines tilt angles of the scattering bodies in the plate-shaped sample with respect to a reference rotation position at which a surface of the plate-shaped sample is perpendicular to an incident direction of the X-rays, based on the stored scattering intensity data, wherein the reference rotation position is adjusted so that the laser beam reflected on the surface of the plate-shaped sample is aligned with the X-ray beam path.

8. A non-transitory computer readable recording medium having recorded thereon an analysis program for a fine structure of a plate-shaped sample formed to have columnar scattering bodies that are long in a thickness direction and periodically arranged, the program causing a computer to execute the processes of:

storing scattering intensity data from the plate-shaped sample, that is generated via transmission of X-rays; and determining tilt angles of the scattering bodies in the plate-shaped sample with respect to a reference rotation position at which a surface of the plate-shaped sample is perpendicular to an incident direction of the X-rays, based on the stored scattering intensity data, wherein the reference rotation position is adjusted so that the laser beam reflected on the surface of the plate-shaped sample is aligned with the X-ray beam path.

* * * * *